E. BERNICK.
DISTANCE MEASURING INSTRUMENT OF THE COINCIDENT IMAGE TYPE.
APPLICATION FILED NOV. 25, 1911.
1,038,831.
Patented Sept. 17, 1912.
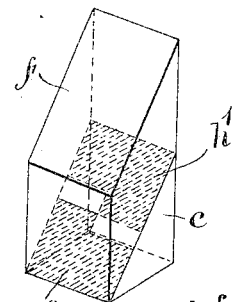
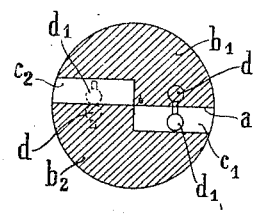
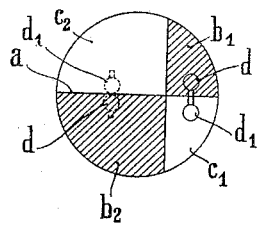
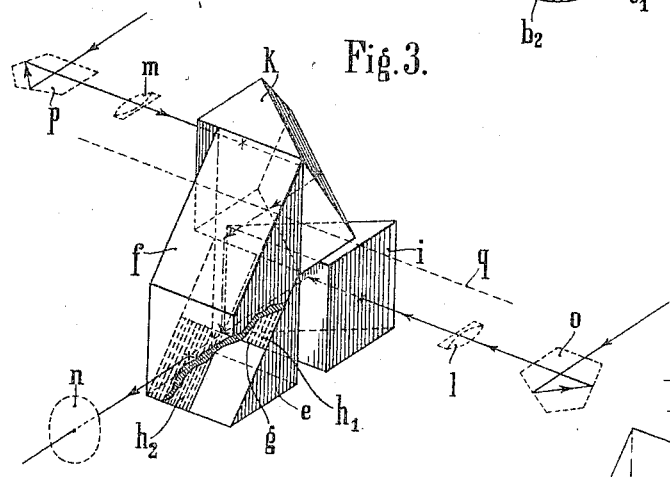
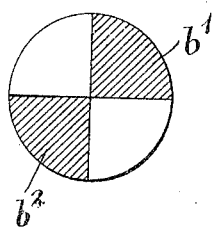

UNITED STATES PATENT OFFICE.

ERNST BERNICK, OF RIGA, RUSSIA, ASSIGNOR TO THE FIRM OF OPTISCHE ANSTALT C. P. GOERZ AKTIENGESELLSCHAFT, OF FRIEDENAU, NEAR BERLIN, GERMANY.

DISTANCE-MEASURING INSTRUMENT OF THE COINCIDENT-IMAGE TYPE.

1,038,831.  Specification of Letters Patent. Patented Sept. 17, 1912.

Application filed November 25, 1911. Serial No. 662,283.

*To all whom it may concern:*

Be it known that I, ERNST BERNICK, citizen of the German Empire, residing at 81 Nikolaistrasse, Riga, Russia, have invented certain new and useful Improvements in Distance-Measuring Instruments of the Coincident-Image Type, of which the following is a specification.

This invention relates to distance measuring instruments of the "coincident image" type, that is to say, distance measuring instruments wherein images of a distant object appear at opposite sides of a dividing line and are brought into coincident relation with each other at corresponding points by means of adjusting mechanism.

The object of the invention is to provide, in distance measuring instruments of this class, in which images inverted or symmetrical relatively to each other appear at opposite sides of the dividing line of the field, means whereby the upright and the inverted image can be displaced relatively to the dividing line so that any desired points of the objects lying above and below, or to the right and left, can be brought into coincidence. This enables account to be taken of the various shapes of the objects observed, the most striking features thereof being utilized for the purpose of the adjustment.

The invention is illustrated in the accompanying drawing, in which:—

Figures 1 and 2 are diagrammatic views of image fields of distance measuring instruments constructed according to the invention. Fig. 3 shows one form of ocular prism arrangement of a distance measuring instrument constructed according to the invention. Fig. 4 shows a prism device with reflecting layers corresponding to the form of the field of view illustrated in Fig. 1. Fig. 5 illustrates in perspective view the arrangement of reflecting layers in the prism device of Fig. 4 corresponding to the field of view illustrated in Fig. 2. Fig. 6 shows the field of view which results from an arrangement of the reflecting layers in the ocular prism device of the instrument illustrated in Fig. 3.

In the view shown in Fig. 1 of the image field of a distance measuring instrument the dividing line of the field is marked $a$. This dividing line traverses the entire diameter of the field. At opposite sides of the dividing line lie field sections $b_1$ $b_2$, which are hatched in the drawing, and each of which contacts with only part of the dividing line. $c_1$ and $c_2$ are two other sections of the field, which, like the sections $b_1$ $b_2$, only contact with parts of the dividing line. The objects which appear in the sections $b_1$ $b_2$ appear upright, as illustrated, for example, in the case of an air-ship $d$ $d_1$, the air-ship in the section $b_1$ being shown in solid lines and that in the section $b_2$ in dotted lines. In the sections $c_1$ $c_2$ the images of the object appear inverted, as shown in section $c_1$ in solid lines and in section $c_2$ in dotted lines. The observation of the object $d$ $d_1$, may be made in the sections $b_1$ $c_1$, in which case the bottom portions are brought into coincidence at the dividing line $a$, or in the sections $b_2$ $c_2$, in which case the top portions are brought into coincidence. By turning the instrument through a small angle the object can be shifted from $b_1$ $c_1$ to $b_2$ $c_2$, or vice versa.

In the image field in Fig. 2 there is also a dividing line $a$, at opposite sides of which are field sections $b_1$ $c_1$ and $b_2$ $c_2$. The objects are also marked $d$ $d_1$.

In the arrangement of ocular prisms shown in Fig. 3, giving an image field of the kind shown in Fig. 6, a reflective coating is provided at the contact surface of a three-sided rectangular prism $e$ and a rhombohedral prism $f$, this coating consisting of two parts, the border line of which is marked $g$. One of the two parts of said coating, namely, the section $h_1$, lies above the line $g$, and the second section $h_2$ below the same. On the back side of the composite prism $e$ $f$, that is to say in the path of the rays coming from the distant object and entering the composite prism, there are two prism bodies $i$ $k$, which project to the prism body $e$ $f$, the rays coming from the objectives $l$ $m$ of the distance measuring instrument. The observation of the image field is made through the ocular $n$. The rays from the distant object are directed toward the objectives $l$ $m$ by pentagonal prisms $o$ $p$, which, like the objectives $l$ $m$ and the ocular $n$, are only diagrammatically indicated in the drawing by dotted lines. $q$ marks the position line of the distance measuring instrument. The border line $g$ of the mirror surfaces $h_1$ $h_2$ is parallel with the position line $q$ and lies in the field of the objectives $l$ $m$ and ocular $n$. If that part of the prism body $e$ $f$ is used, which in the drawing is on the right hand side, the rays passing through the objective $l$ and not striking the back of the mirror coating $h_1$ pass outward directly through the contact surface of the prisms $e$ $f$ into the ocular, whereas the rays from the objective $m$, after being reflected by a surface of the rhombohedral prism $f$ and the section $h_1$ of the mirror pass into the ocular $n$. These rays thus undergo two reflections in the prism body $e$ $f$ whereas the rays from $l$ are not reflected. In order that the image on one side of the dividing line in the field may appear upright, and that on the other side reversed, the prism $k$, has a roof edge, the prism $i$ being merely a three side rectangular prism without roof edge. When the left hand part of the prism body $e$ $f$ is used for observation the rays from the objective $l$ with the exception of those intercepted by the back of the reflective coating $h_2$, pass without reflection through the prism body $e$ $f$ above the line $g$ into the ocular $n$, whereas the rays from the objective $m$, after being reflected by a surface of the rhombohedral prism $f$ and the surface $h_2$ below the border line $g$, enter the ocular $n$. When the right hand half of the prism body $e$ $f$ is used for observation the rays from the objective $l$ pass below the border line $g$ in the image field without reflection directly through the prism body $e$ $f$, whereas the rays from $m$ pass out over the line $g$, after reflection by a surface of the rhombohedral prism and by the mirror surface $h_1$, and enter the ocular $n$. Thus the images shown in Fig. 6 are produced in the field, according to whether the right hand or left hand half is used. The translation from one image position to the other is made simply by rotating the instrument about its vertical axis, without requiring correction of the image position by adjustment of optical elements of the instrument. After the rotation, of course, the images are brought into coincidence at the most favorable point, by slight tilting.

In the case of distance measuring instruments which are mainly used for observation of objects on the ground, whereof the most striking features are usually at the top it is desirable to have the field section used for such observations larger than that which is used for observation of objects whereof the most striking feature is usually at the bottom, for example air-ships. A convenient divison of the field is shown in Fig. 2.

The arrangement of reflecting surfaces $h_1$, $h_2$ in the contact surface of prisms $e$, $f$ which results in the formation of the field of view illustrated in Fig. 2 is represented in Fig. 5. Fig. 4 shows the arrangement of the reflecting coatings in the contact surface between prisms $e$ and $f$ resulting in the formation of a field of view in Fig. 1.

Instead of having the dividing line horizontal in the field it may be substantially vertical, as is usual in the case of so-called symmetry distance measuring instruments, the latter being, in this specification, included in the general term coincident image instruments.

What I claim is:—

1. In a base line telemeter one ocular and image producing and reflecting means adapted to produce two images of distant objects in juxtaposition with each other in the field of view of the ocular, the reflecting means comprising reflecting surfaces forming a substantially straight edge traversing the field of view, said reflecting surfaces arranged partially on the one and partially on the other side of said straight edge.

2. In a base line telemeter an ocular prism device provided with reflecting surfaces having a limiting edge in an image plane of the instrument forming the dividing line in the image field the reflecting surfaces producing the dividing line lying partly on one and partly on the other side of said limiting edge in the image plane.

3. In a base line telemeter an ocular prism device comprising two prisms contacting with each other in a surface crossing the image field, reflecting layers provided in said contact surface having a limiting edge parallel to the base line of the instrument and coincident with an image plane of the instrument said reflecting layers having sections positioned on opposite sides of said limiting edge.

In testimony whereof I have signed this specification in the presence of two subscribing witnesses.

ERNST BERNICK.

Witnesses:
 HENRY HASPER,
 WOLDEMAR HAUPT.